United States Patent [19]

Grotto et al.

[11] Patent Number: 4,718,592
[45] Date of Patent: Jan. 12, 1988

[54] APPARATUS FOR SOLDERING AN ORNAMENTAL CHAIN WITH LOOPS HAVING TWO INTERTWINED STRANDS

[76] Inventors: Ferdinando Grotto, Via Monte Novegno, 39 Bassano Del Grappa (Vicenza); Franco Bassan, Via Giulietti, 35 Vicenza; Giovanni Campora, Via Gasparoni, Vincenza, all of Italy

[21] Appl. No.: 943,562

[22] Filed: Dec. 18, 1986

[30] Foreign Application Priority Data

Dec. 24, 1985 [IT] Italy .................... 85626 A/85

[51] Int. Cl.⁴ .................................... B21L 3/02
[52] U.S. Cl. .................... 228/47; 228/192; 59/34
[58] Field of Search .............. 228/47, 45, 192, 212, 228/213, 225, 247; 59/34; 219/51, 52

[56] References Cited

U.S. PATENT DOCUMENTS

| | | | |
|---|---|---|---|
| 4,012,618 | 3/1977 | Ebel et al. | 228/192 |
| 4,569,472 | 2/1986 | Zettl | 228/192 |
| 4,644,743 | 2/1987 | Bucefari et al. | 228/192 |
| 4,658,576 | 4/1987 | Massimo et al. | 59/34 |

*Primary Examiner*—Nicholas P. Godici
*Assistant Examiner*—Samuel M. Heinrich
*Attorney, Agent, or Firm*—Bucknam and Archer

[57] ABSTRACT

An apparatus for discontinuously and simultaneously soldering an ornamental chain on two locations and with recovery of the cores which hold the loops, comprises a reel (2) for winding and unwinding the chain to be soldered, a pair of rollers (3,4) for advancing the chain, a movable and rotating vice for carrying the chain to the soldering device. The latter comprises two flame injectors, arranged opposite one to the other and acting on the loops of the chain, a pair of vertically movable clamps for holding the chain during the soldering operation, in the two predetermined locations. Finally after the soldering operations, the cores are removed from the chain and are separately collected.

5 Claims, 13 Drawing Figures

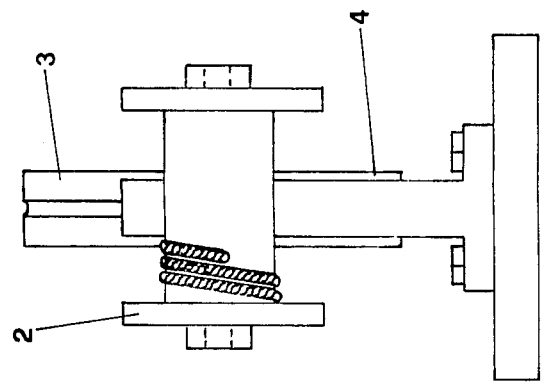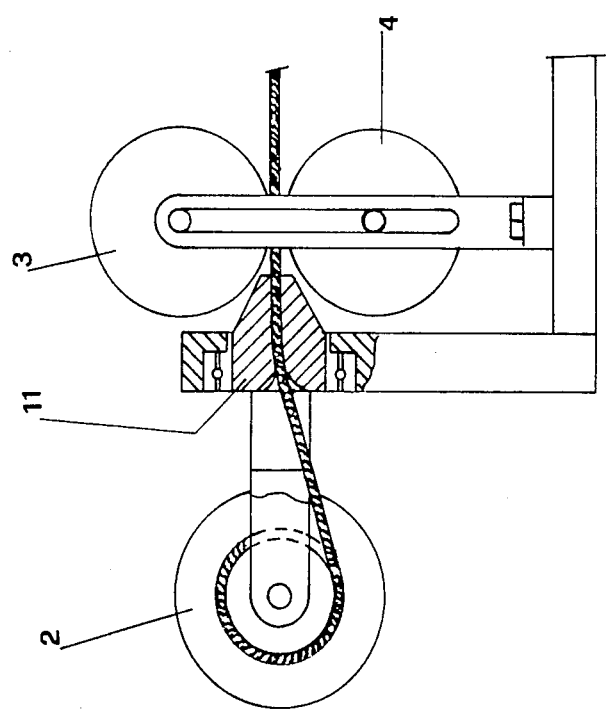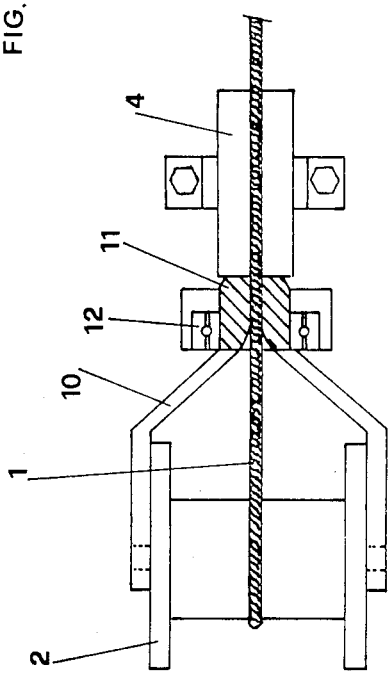
FIG. 3
FIG. 2
FIG. 4

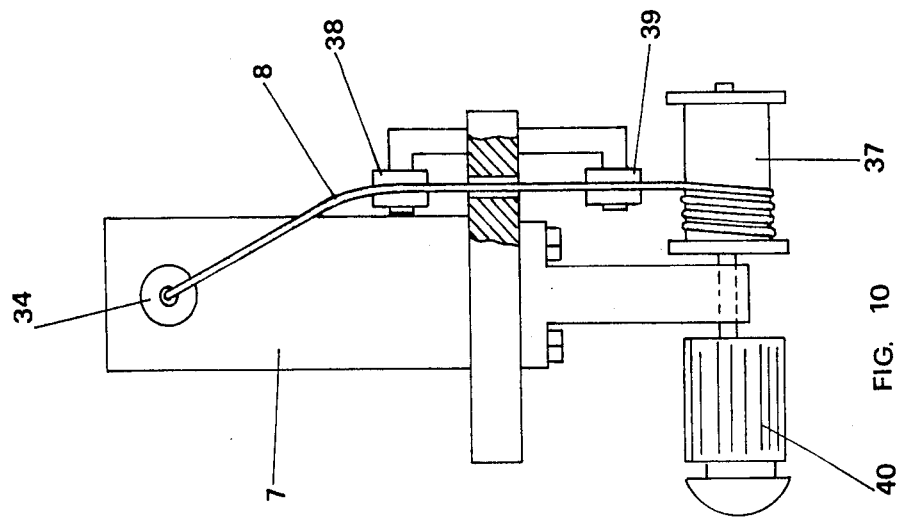
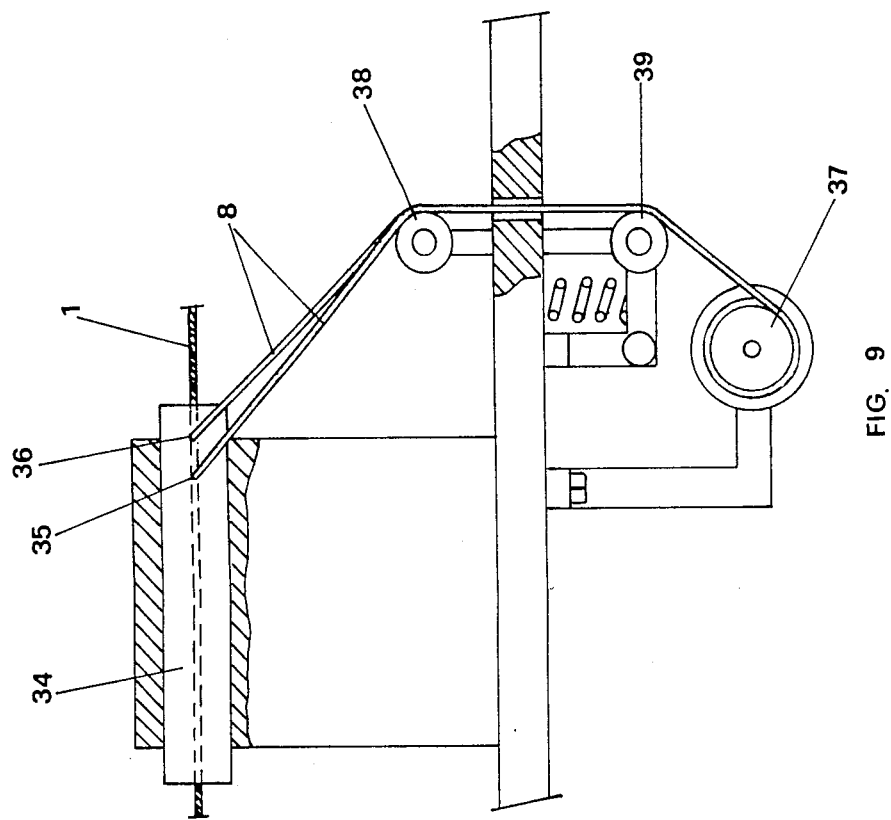

APPARATUS FOR SOLDERING AN ORNAMENTAL CHAIN WITH LOOPS HAVING TWO INTERTWINED STRANDS

The present invention relates to ornamental chains of the type of ropes with two strands and more specifically, it relates to an apparatus which permits to carry out the soldering simultaneously on two links left and right respectively of an ornamental chain and which also provides for the recovery of the cores on the thread which generally are made of brass and which hold together the rings of the chain prior to soldering.

Essentially, a chain of the type of a rope made of two strands is wound on a reel, it is then unwound and is caused to pass, first of all between two rollers opposite one to the other which set the rings, it is then grasped by a clamp with pincers which permits to cause the chain to rotate on its axis and causes the chain to advance one step while two brass threads constitute the supporting core of the two strands which form the rope. The rings are then soldered exactly in the desired position by means of two flames which act on two different points of the rope corresponding to the two strands.

While the rope proceeds alternately with operations of advancing or rotation alternated by soldering operations, the rope is caused to advance within a suitable device from which the cores are extracted and finally the rope is wound on a collecting reel, the support of which is caused to rotate together with the chain on the basis of the step of the chain.

The apparatus will now be described in more detail by reference to the accompanying drawings of which:

FIGS. 2, 3 and 4 illustrate respectively a side view, a front view and a top view of the first part of the apparatus which comprises the packing rollers;

FIGS. 9 and 10 illustrate respectively a side view and a front view, partially in cross-section of the device which permits the removal of the brass cores on the thread from the strands of the rope;

Figure 1:
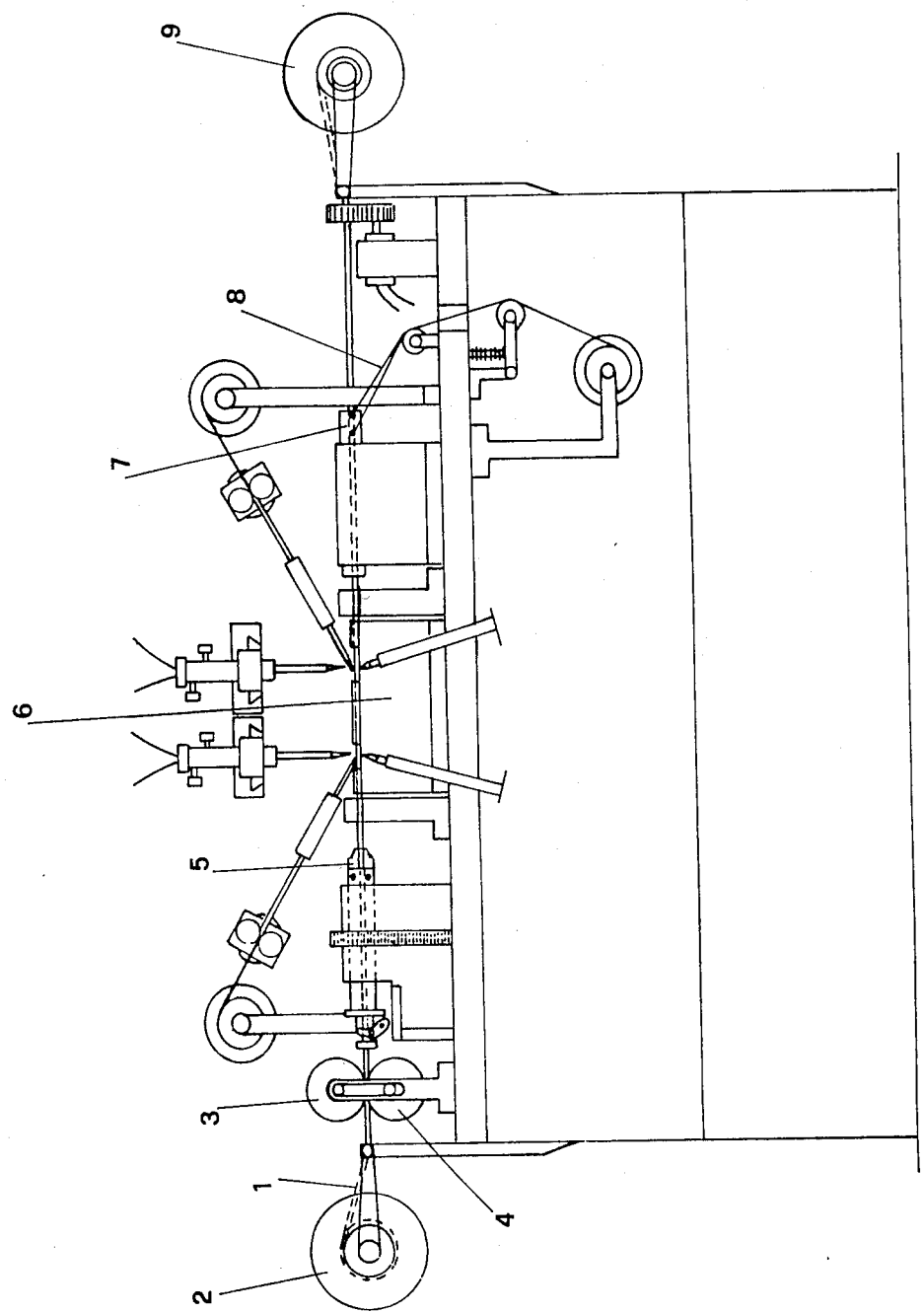
FIG. 1 is a schematic side view of the overall apparatus.

As shown in FIG. 1, the chain designated by numeral 1 in the form of rope with two strands is unwound from the reel 2 and then is caused to pass between two rollers 3 and 4 which set the links and is then brought in the interior of pincers 5 which rotate while they advance one step and cause the chain to rotate and advance prior to entering the device 6 where the rings are soldered.

Afterwards, the chain enters a hollow conduit while being held by vice 7, where the two brass threads 8 are removed from the chain. The two threads 8 form the core which holds the chain during the operation while the chain itself is collected at the end of the operation on reel 9.

The details of the apparatus are shown in the figures. In FIGS. 2, 3 and 4, reel 2 feeds the chain 1 which is being unwound and is mounted on vice 11 by means of bracket 10. Vice 11 rotates on pad 12 which permits the rotation on its axis prior to passing between rollers 3 and 4 which set the strands while they compress the rope slightly.

Figure 5:
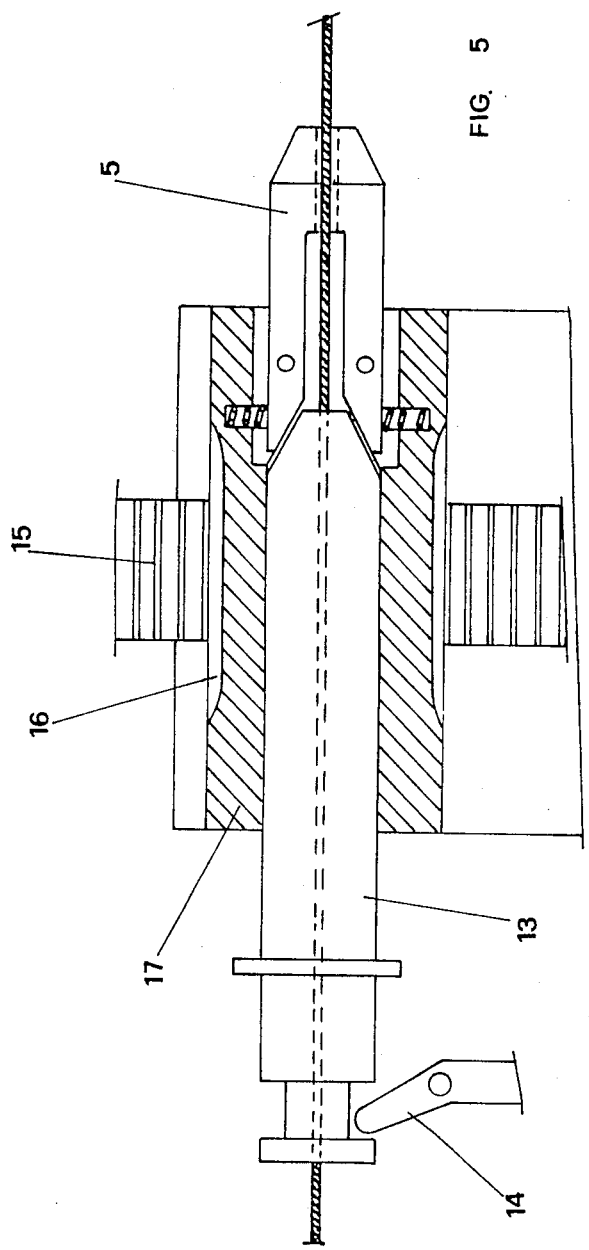
FIGS. 5 and 6 illustrate a side view in cross-section and a top view respectively of the vice which causes the chain in operation to advance and rotate.
Figure 6:
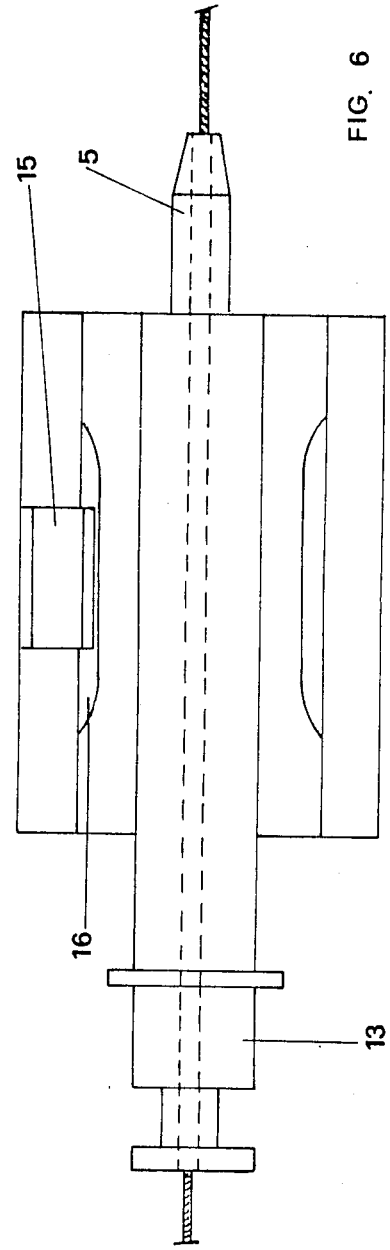

The advance of the chain is carried out by vice 5 as shown in FIGS. 5 and 6 which closes itself on the chain at the appropriate time and causes the chain to advance under the action of hollow cylinder 13. As shown in FIG. 5, the longitudinal motion of the hollow cylinder 13 is controlled by lever 14 while the motion of rotation is controlled by rack 15 which engages teeth 16 formed in the sleeve 17. Cylinder 13 and vice 5 may slide within sleeve 17 longitudinally.

Figures 7, 8:
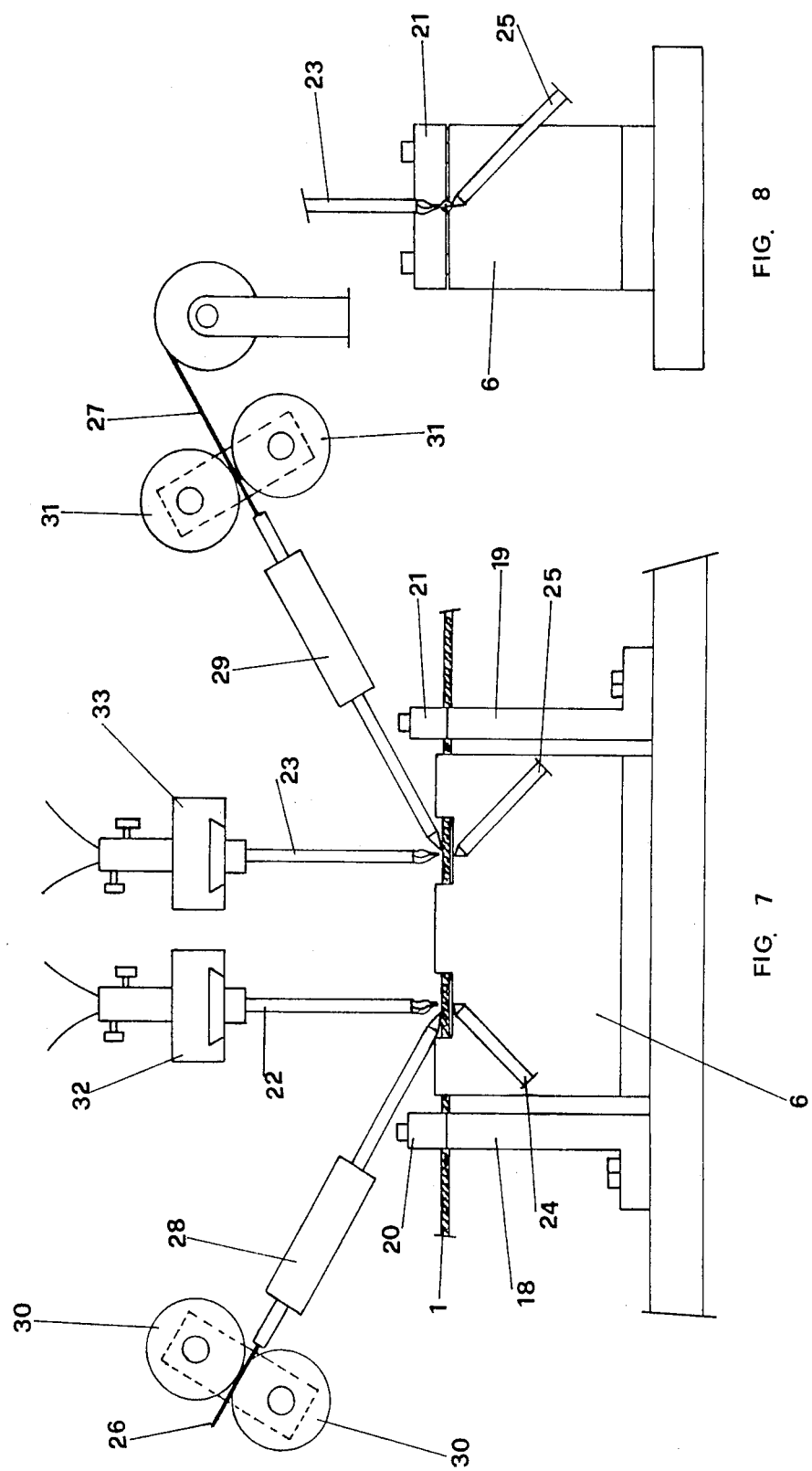
FIGS. 7 and 8 illustrate respectively a side view and a front view of the pair of flames which are used to act on the chain and to solder the chain.

FIGS. 7 and 8 show the part of the apparatus used in the soldering operation. Chain 1 advances between the two supports 18 and 19. The two upper jaws 20 and 21 of the supports are movable vertically because they are raised during the motion of advance of the chain 1 and may be lowered when the chain must remain blocked in the space between the two supports 18 and 19.

In the interior of this space, the chain is caused to pass within a tubular conduit formed along support 6 and cut corresponding to the soldering points where flames 22 and 23 act together with centering rods 24 and 25 which set the loops of the chain while the materials 26 and 27 for the soldering operation are fed as threads made of an alloy. The two threads 26 and 27 are guided through suitable cylinders 28 and 29 by the two pairs of rollers 30 and 31 which serve to advance the thread and which are opposite one to the other.

The torches which carry the flames 22 and 23 are movable transversely along guides 32 and 33 in order to present themselves in the soldering position exactly at the desired time.

The soldering operations must be carried out simultaneously on two different loops of the rope and they must be repeated exactly a predetermined number of times during the rotation of one revolution of the chain in order to stabilize the position as desired.

Subsequently the chain always under the action of the vice 5 enters the guiding tube 34 as shown in FIGS. 9 and 10 which is mounted on support 7. The brass threads of cores 8 are removed through the lateral openings 35 and 36 from the interior of the chain 1. The brass threads 8 are wound on the winding reel 37 after passing on tensioning rollers 38 and 39. Numeral 40 is an electrical motor which controls the rotation of reel 37, as shown in FIG. 10.

Figure 12:
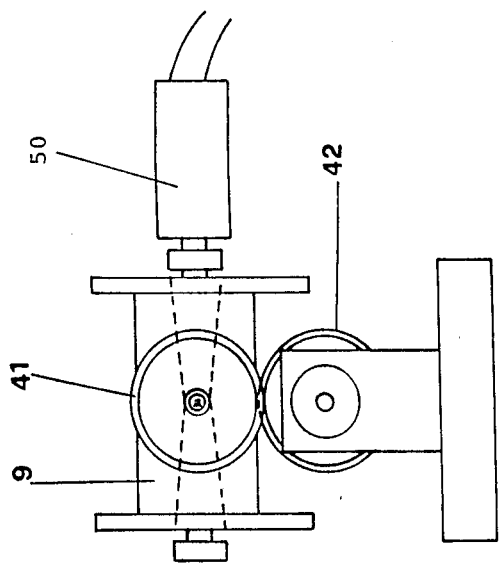
FIGS. 11 and 12 illustrate a side view partially in cross-section and a front view of the last part of the apparatus which comprises the roller used for winding the chain at the end of the operation.
Figure 11:
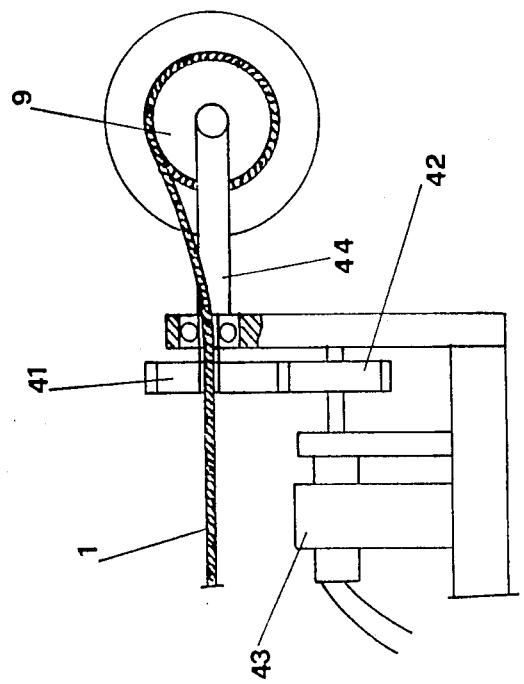

In the rear part of the apparatus, chain 1 goes through the central opening of toothed gear 41 as shown in FIG. 11. This gear engages with the toothed gear 42, the latter being placed in rotation by the electric motor 43 so as to cause rotation of the chain 1 jointly with the support 44 of reel 9. The latter collects the finished chain and is placed in rotation by the electric motor 50 as shown in FIG. 12.

Clearly, the reel 9 is not necessary when chain 1 after the operation is completed, is simply collected in a suitable container which could be placed at the bottom of the apparatus.

Figure 13:
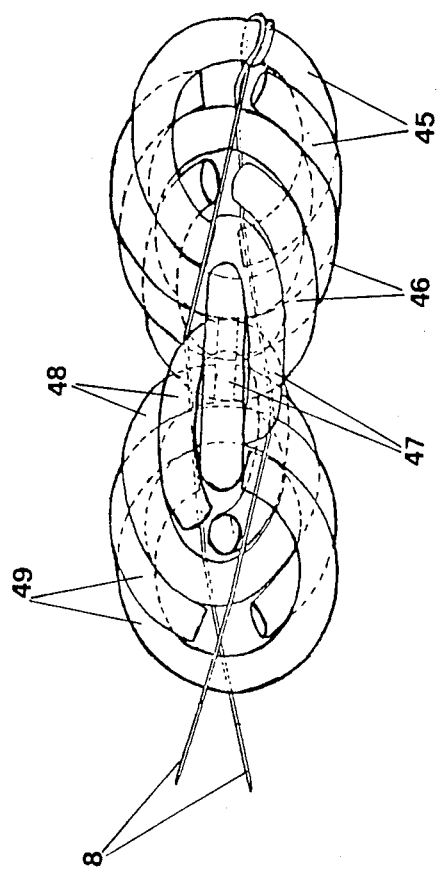
FIG. 13 illustrates a part of the chain made of two strands of the type being worked with the apparatus according to the invention on an enlarged scale.

FIG. 13, by way of illustration, shows a section of the chain of the type of a rope from two strands and also shows the brass cores 8 while the soldering operations are carried out between pairs of adjacent loops 45, 46, 47, 48 and 49.

The advantages according to the present invention are clear if one considers that it is possible to carry out automatically and in a perfectly programmed manner, the operations of soldering of the loops which constitute the two strands of ornamental chains in the form of a rope and at the same time, the interruptions of operations are reduced to the operations of loading and unloading of the reels which carry the chains to be worked and the chains after having been worked.

The apparatus according to the present invention is completely adaptable to various sizes of chains with different diameter of the strands and different steps of the loops with simple and easily predeterminable operations

What is claimed is:

1. An apparatus for soldering an ornamental chain of the type of a rope made from two intertwined strands with loops for simultaneously soldering on two locations and with recovery of the cores which hold the loops, which comprises first means (2) for winding and for unwinding the chain to be soldered, second means for advancing the chain to a soldering device, said soldering device comprising two flame injectors, arranged opposite one to the other and acting on the loops of the chain, a pair of vertically movable clamps for holding the chain during the soldering operation, a support (6) having a longitudinal opening for passing the chain through, said support having two recesses in the two locations where soldering is carried out, means (26,27) for feeding the soldering material to said two locations and means (32 and 33) for displacing transversely said flame injectors after said soldering operations away from the chain, third means for winding the chain and fourth means for recovering the cores from said chain after said soldering operations are completed.

2. The apparatus according to claim 1 wherein said first means is a reel, and said chain is unwound from the reel and said second means for advancing the chain to the soldering device comprises a pair of rollers opposite one to the other.

3. The apparatus according to claim 2 wherein said second means comprises a movable and rotating vice (5) located downstream of said rollers, said chain passing through said vice, whereby said chain advances towards said soldering device and rotates, and said second means comprises a first cylinder (13), lever means acting on said first cylinder and imparting a longitudinal motion thereto, said chain passing through said first cylinder, said second means comprises a rack (15) engageable with a toothed gear, said rack imparting rotating motion to said chain, said first cylinder and said rack being located upstream of said vice.

4. The apparatus according to claim 1 which comprises a second cylinder (34) downstream of said soldering device, said second cylinder being provided with two lateral openings, said chain passes within said cylinder after the soldering operation, the cores are removed from the chain in said second cylinder and the apparatus comprises third means (9) for collecting said chain and fourth means (37) for collecting said cores.

5. The apparatus according to claim 1 wherein said soldering device comprises centering rods (24 and 25) for locating said chain at said two locations.

* * * * *